R. S. WILLIAMS.
MILLSTONE DRESS.

No. 185,380. Patented Dec. 12, 1876.

WITNESSES
Harry King
W. E. Chaffee

INVENTOR
Robert S. Williams
By his Attorneys
Stansbury & Munn.

THE GRAPHIC CO. N.Y.

UNITED STATES PATENT OFFICE.

ROBERT S. WILLIAMS, OF MILWAUKEE, WISCONSIN, ASSIGNOR OF ONE-HALF OF HIS RIGHT TO JAMES B. MARTIN, OF SAME PLACE.

IMPROVEMENT IN MILLSTONE-DRESS.

Specification forming part of Letters Patent No. 185,380, dated December 12, 1876; application filed November 13, 1876.

*To all whom it may concern:*

Be it known that I, ROBERT SAMUEL WILLIAMS, of the city of Milwaukee, in the State of Wisconsin, have invented certain Improvements in Millstone-Dressing; and I do hereby declare the following to be a full and correct description of the same, reference being had to the accompanying drawings, in which—

Figure 1:
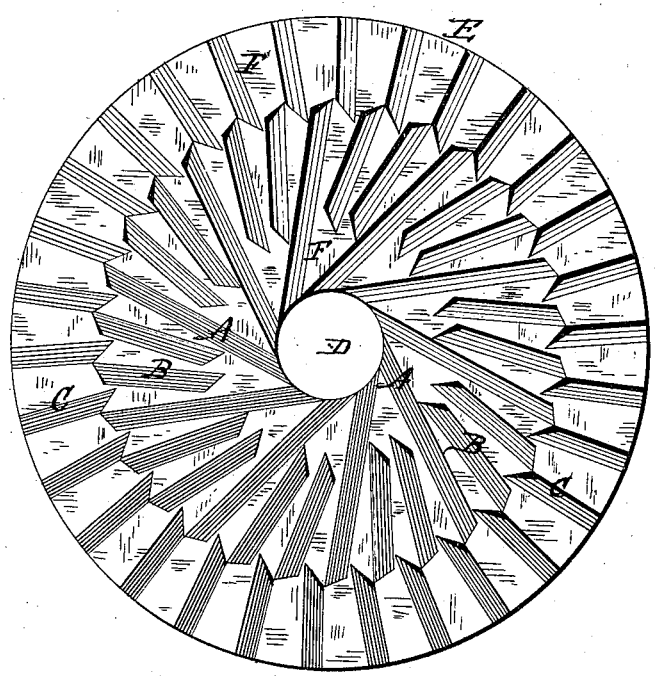
Figure 2:
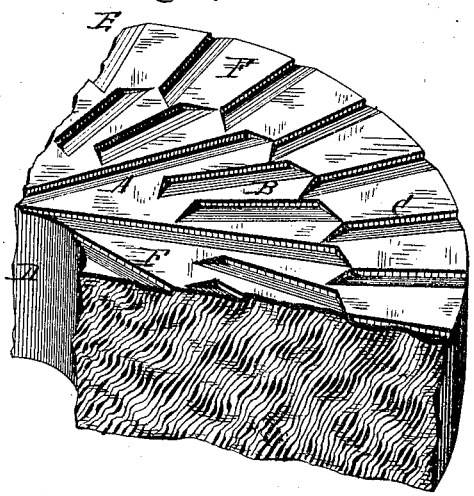

Figure 1 is a top-plan view, and Fig. 2 an enlarged view of a section or fragment of the same.

The nature of my invention consists in providing the stone with three or more independent or separate series of furrows, cut and arranged in a peculiar manner—the first extending tangentially from the eye of the stone about two-thirds of the distance to its periphery, and then terminating; the second arranged between them, but in a less tangential direction on the bosom of the stone, and the third arranged with less draft on the skirt beyond the first two series, in such a way as not to be directly connected with them. The first, or those leading or drawing from the eye of the stone, may be ten in number; the second, or those on the bosom, may be twenty, while those upon the skirt may be thirty or more. Between all these furrows are left land-surfaces.

The object of this arrangement of furrows is, first, to draw the grain rapidly from the eye of the stone, and then to arrest it upon the bosom of the same, and subject it to more perfect granulation, and then to have it pass on to the skirt, where it is subject to still more perfect granulation, by reason of the more rapid movement of that portion of the stone and the slower outward movement of the grain, caused by its having been partially arrested by the terminus of the first two series of furrows, thus securing a more thorough grinding and a larger amount of finer quality of flour than can be produced from the same quantity of grain by any of the stone-dressings heretofore used.

In the drawings, A represents the first series of furrows, leading tangentially from the eye D of the stone E. B represents the second series upon the bosom of the stone, arranged between the first series, as shown; and C represents the third series as arranged upon its skirt, in the manner clearly shown.

All of these furrows are cut with their rear sides perpendicular to the face of the stone, and then extending by an incline to the land of the same, as shown. The first series, A, start from the eye of the stone; the second series, B, start from a point on the bosom of the same, and both terminate at a point about two-thirds of the way from the eye to the periphery of the same, as shown. The inner ends of the second series and the outer ends of both the first and second series terminate with end inclined to their length, for the better delivery of the grain to the lands F, as shown. The third series, C, have their inner ends inclined, as shown, so as to receive the grain from the lands between the first and second series, as shown, and so that their deep sides may be on a line, or nearly so, with the upper sides of the inclines of the first two series.

The operation of a stone thus dressed will be readily understood. The grain is taken from the eye and drawn by the first series of furrows, A, out upon the stone, and then pretty thoroughly ground by them in connection with the second series of furrows, B, on the bosom of the same, being partially arrested for that purpose, by reason of the terminus of these furrows, before reaching the periphery. It is then delivered to the third series of furrows, C, on the skirt, when it is still more thoroughly ground by reason of the greater number of furrows and the smaller draft, the increased amount of land-surface, the slower outer motion of the grain, and the more rapid motion of that portion of the stone.

Having thus described my invention, what I claim is—

The millstone-dress consisting of the furrows A, B, and C, constructed and arranged substantially as described, and for the purpose specified.

The above specification of my said invention signed and witnessed, at Milwaukee, this 10th day of November, A. D. 1876.

ROBERT SAMUEL WILLIAMS.

Witnesses:
ALPHONS HAESELER,
CHARLES C. PULVER.